F. B. A. ROYER de la BASTIE.

TEMPERING GLASS AND FURNACE THEREFOR.

No. 6,972. Reissued March 7, 1876.

Francois Barthelemy Alfred Royer de la Bastie
Inventor.

By Atty.

Witnesses.
J. W. Shumway
Clara Broughton.

UNITED STATES PATENT OFFICE.

FRANÇOIS B. A. ROYER DE LA BASTIE, OF PARIS, FRANCE.

IMPROVEMENT IN TEMPERING GLASS AND FURNACES THEREFOR.

Specification forming part of Letters Patent No. 157,717, dated December 15, 1874; reissue No. 6,972, dated March 7, 1876; application filed February 25, 1876.

DIVISION B.

*To all whom it may concern:*

Be it known that I, FRANÇOIS BARTHELEMY ALFRED ROYER DE LA BASTIE, of Paris, in the Republic of France, have invented a new Improvement in Tempering Glass and Furnaces therefor; and I do hereby declare the following, when taken in connection with the accompanying drawings and the letters and figures of reference marked thereon, to be a full, clear, and exact description of the same, and which said drawings constitute part of this specification, and represent, in—

Figure 1:
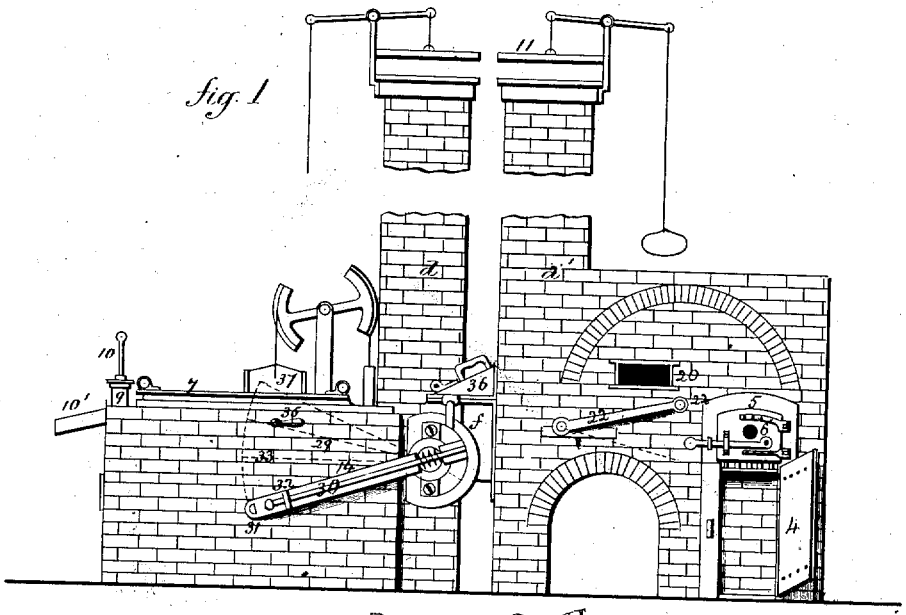
Figure 2:
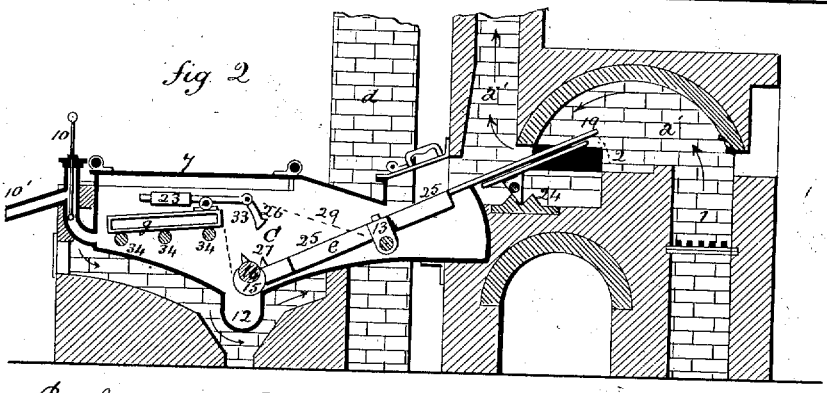
Figure 3:
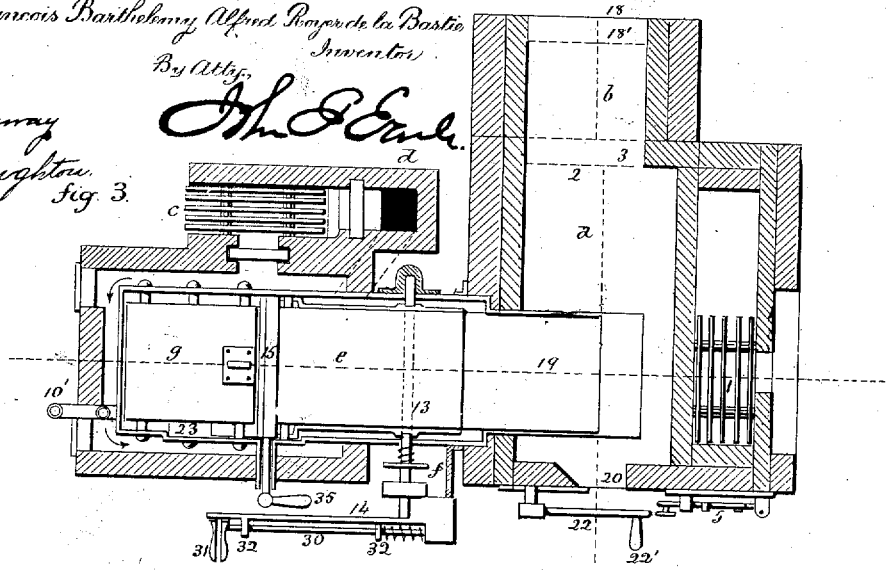

Figure 1, front view; Fig. 2, vertical section; Fig. 3, sectional plan of a furnace, more particularly applicable to the tempering of flat glass.

This invention relates to a process of tempering glass and glass articles, so as to render them less fragile, and to the construction and arrangement of furnaces for effecting the said process.

As the fragility of glass results from the weakness of the cohesion of its molecules, it may be expected that by forcing the molecules closer together and rendering the mass more compact, the strength and solidity of the material should be increased. I have found that this cannot be effected by compression, even when applied to the material in a fluid or soft condition. I have, therefore, applied to glass a system of tempering which imparts to the glass the properties of strength, solidity, and resistance to fracture; and I will now describe the process and apparatus for this purpose.

Fused glass dropped into water becomes greatly contracted, but, being shapeless, only objects of curiosity can be produced in this way. The sudden cooling in the water puts the glass into a state of unstable equilibrium in its constitution, so that the least shock causes it to break, as in the case of Prince Rupert's drops.

My object is to diminish, or even to remove, the extreme fragility of glass. In attaining this object two essential conditions have to be determined: First, the point at which glass can be tempered without being put out of shape. I have found this to be when it is just at the heat where softness or malleability begins, the molecules being then capable of closing suddenly together, condensing the material when it is plunged in a liquid at a considerably lower temperature. Also, glass, when it is thin, may be tempered at red heat even before becoming soft. Secondly, the tempering medium to be employed for the immersion of the glass is such as can be heated much higher than water without boiling. For this purpose I find oils and grease, wax, resin, and tar or pitch suitable.

Having settled these conditions, I have devised the process or practical method of operating and suitable furnaces, which will hereafter be described; and my invention consists in an apparatus whereby the heated glass may be transferred directly to the tempering medium, as more fully hereinafter described.

In carrying out the process it is necessary that the glass to be tempered should be raised to a very high temperature. The hotter it is the less is the risk of breaking the glass, and the greater is the shrinkage or condensation; hence the advantage, and often the necessity, of heating the glass to the point of softening, which is attended by the difficulties that glass in the soft condition gets readily out of shape, so that it must be plunged almost without touching it, and that in plunging the hot glass into a heated combustible liquid the latter is apt to take fire, and cannot easily be extinguished, so that time and material are lost. These difficulties I have overcome by placing the tempering-bath in immediate communication with the heating-oven and covering it, so as to prevent access of air. The oven being charged with the articles to be tempered, these are pushed or caused to slide into the adjoining bath without handling them, and the tempering medium in the bath, having no supply of external air, is not liable to inflame, if of an inflammable nature.

In order that the shape of the tempered articles may not be affected, particularly for flat glass, the floor of the oven is made to cant, so that when the glass is heated on it it is turned to a sloping position, and the glass slides into the bath along a surface therein arranged at the same slope as that of the oven-floor. Small articles may be heated on the edge of the bath, and immersed by a slight push. The clearness of the glass may be affected by the dust of the furnace flame, which is apt to settle on the glass and chill its surface. I avoid this by heating the glass in a muffle, to which the flame has no access, being applied externally. Moreover, the shock of the fall of glass into the bath is prevented by fixing therein a sheet of wire-gauze or asbestus fabric, or providing a bed of sand or other like material for the glass to fall on.

I will now describe the furnace for carrying out in practice the process which I have generally set forth above: The oven *a* is heated by the furnace 1, and by its side is a preparatory oven, *b*, communicating with it by an opening, 2, in the separating-wall 3. *a'* is the chimney. When the oven *a* is sufficiently heated, the doors 4 and 5 are closed and luted, and the fire is maintained by introducing small pieces of fuel through the hole 6 in the door 5. The draft is then stopped by closing a chimney-cap or damper, 11. The bath C has hinged lids 7, and is provided with a tube, 9, and thermometer 10. By this tube the contents of the bath may be added to or an excess may overflow by the discharge 10'. The bottom of the bath has a receptacle, 12, to receive such glass as may happen to break. A rocking table, *e*, rests on a frame, 25, which is fixed on a shaft, 13, on which is fixed an external lever, 14. An edge, 15, at the end of the table retains a buffer, 16, of wire-gauze or other yielding material. The bath is heated by the fire *c*, the flame of which is made to circulate around and under the bath to the chimneys *a' d*, as indicated by the arrows. The sheets of glass to be tempered are introduced by the opening 18, through the wall 18', into the preparatory oven, where they are gradually heated, and thence they are pushed through 2 onto the oven-floor, and finally onto the rocking table 19, which is faced with very smooth refractory material, and which is in a level position at the time the glass is pushed onto it. When the workman, who watches by the eye-hole 20, finds that the glass is sufficiently heated, he moves the lever 22 by its handle 22', and so cants up the table 19 on its knife-edges 24, bringing it in line with the sloping table *e*. The glass sheet, guided by the sides of the frame 25, slides down the slope without shock or change of shape till its edge rests against the buffer 16. The workman then, by the lever 22, cants the table 19 back to its horizontal position, and pushes onto it another sheet to receive its heat.

The sheet already immersed is removed from the bath in the following manner: The table *e* is raised by the lever 14 till a catch, 26, is made, by its counter-weight 23, to catch under a stud, 27, on the table. The table being thus held, the lever 14 is let go, and is stopped in the position indicated by the dotted lines 29 by a catch sliding into a notch of the sector *f*, the catch-rod being pushed, by a spring placed between the handles 31, along the three guides 32. In this position the buffer 16 and the hooked end of the frame 15 are below the level 33 of the table *e*, the frame moving back with the lever 14, while the table *e* remains resting on the catch 26, so that the workman, by means of a rake, withdraws the glass sheet gently into the compartment *g*, which is supported on three cross-bars, 34. When this is done the catch 26 is withdrawn by an exterior handle, 35, and the table *e* descends to and rests on its frame 25. The workman then withdraws the sliding catch 30 by closing together the handles 31, and lowers the lever 14 and the table *e*, with its frame, until the end of the lever butts against an adjusting-screw, 36, the table being then in the inclined position for receiving another sheet.

For repairing the buffer 16, the cover 7 is opened, the lever 14 is raised until its catch engages in the lowest notch of the arc *f*, the table *e* being then in the position indicated by the dotted line 37, when the buffer is raised above the liquid of the bath.

I claim—

1. In combination with the oven for heating and the bath for plunging, communicating with each other, the rocking table *e*, substantially as and for the purpose specified.

2. In combination with the heating-oven and plunging-bath, the tables *e* and 19, substantially as and for the purpose specified.

3. In combination with the heating-oven and plunging-bath, the rocking table *e* and the receiver *g*, substantially as and for the purpose specified.

F. B. A. ROYER DE LA BASTIE.

Witnesses:

MARIN,

L. NESME.